United States Patent [19]

Mayer

[11] Patent Number: 4,787,337
[45] Date of Patent: Nov. 29, 1988

[54] PET WATER CONTAINER

[76] Inventor: Gerald J. Mayer, 1556 Charmaine, Toledo, Ohio 43614

[21] Appl. No.: 56,373

[22] Filed: Jun. 1, 1987

[51] Int. Cl.⁴ ............................................. A01K 7/00
[52] U.S. Cl. ..................... 119/18; 119/72.5; 222/185
[58] Field of Search ................ 119/18, 51.5, 71, 72.5; 206/217, 547; 248/311.3; 222/538, 540, 181, 185

[56] References Cited

U.S. PATENT DOCUMENTS

| | | | |
|---|---|---|---|
| 2,946,308 | 7/1960 | Harris | 119/18 |
| 3,216,397 | 11/1965 | Pickard | 119/71 |
| 3,942,668 | 3/1976 | Eberle et al. | 220/8 |
| 4,022,159 | 5/1977 | Salvia | 119/72.5 X |
| 4,067,627 | 1/1978 | Hodge | 248/311.3 X |
| 4,401,056 | 8/1983 | Cody et al. | 119/18 |

Primary Examiner—Paul J. Hirsch
Attorney, Agent, or Firm—Marshall & Melhorn

[57] ABSTRACT

A water container for pets includes a plastic drinking bottle having a drinking tube extending therefrom and a metal enclosure for supporting and protecting the drinking bottle. The enclosure is formed with a rear panel, a pair of side panels and a pair of front panels defining a vertically extending slot between them. Attached to the side panels are a pair of bottom panels which also form a slot therebetween for receiving the drinking tube. The upper end of the enclosure is open for receiving and providing access to the drinking bottle. Apertures are formed in the rear panel for cooperation with hooks or hangers for supporting the enclosure and drinking bottle in a cage for a small animal. Flanges can be formed on the bottom panels to extend downwardly from the slot between the bottom panels to prevent rotation of the drinking tube.

3 Claims, 2 Drawing Sheets

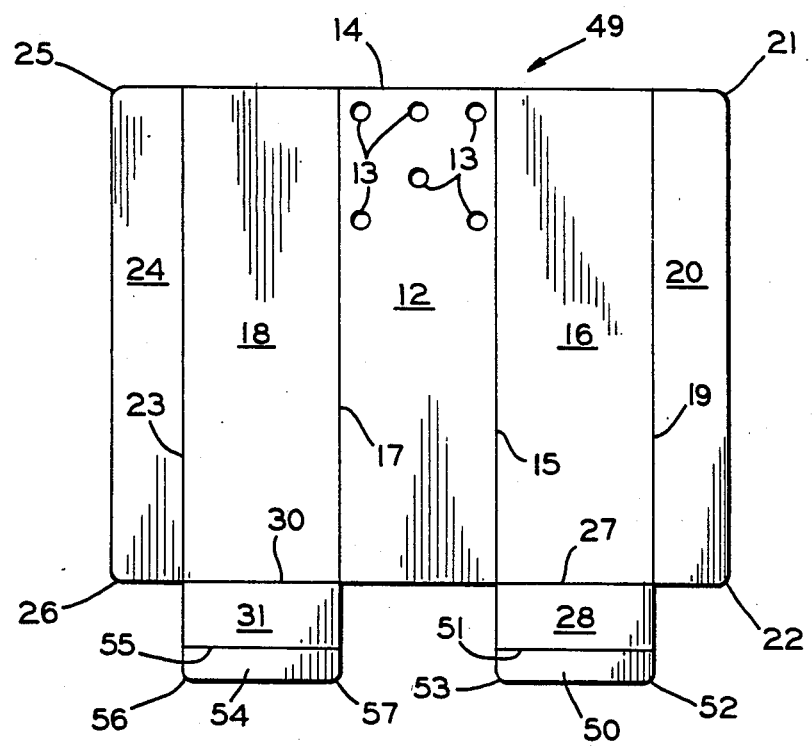
FIG. 5
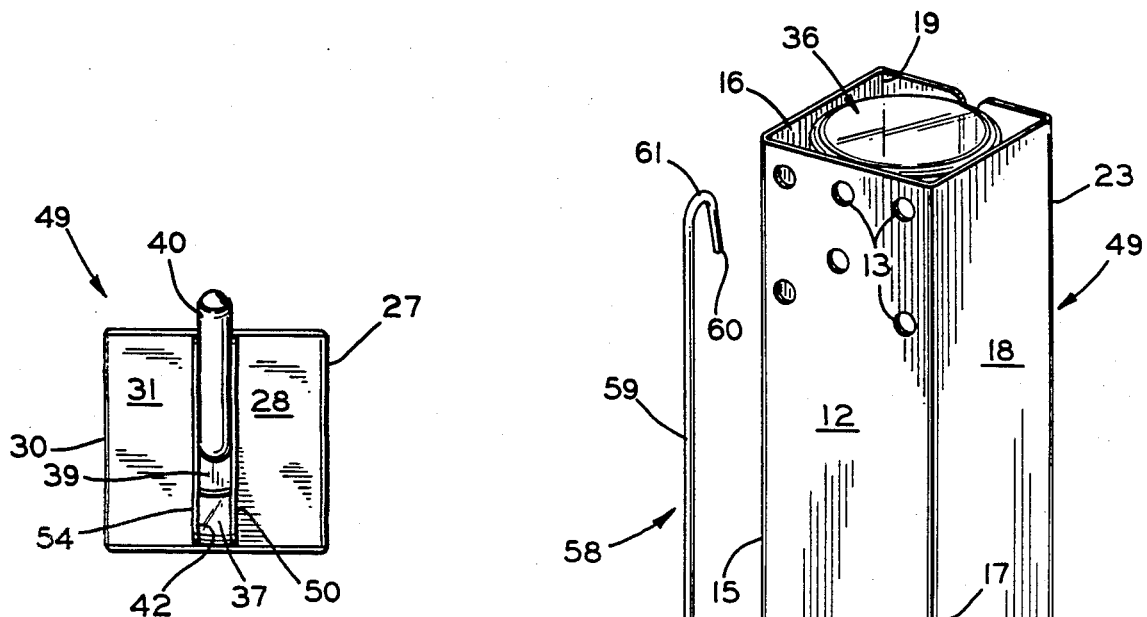
FIG. 6
FIG. 7

PET WATER CONTAINER

BACKGROUND OF THE INVENTION

The present invention relates to a device for supplying water to pets and, in particular, to a protective enclosure for water bottles for small pets.

Small pets, such as mice, hamsters and gerbils are typically kept in a cage with containers for food and water. Prior art water containers were made out of metal, glass and plastic with an open end drinking tube having a resilient closure. However, such a device caused problems with drippage, leakage and unavoidable backflow of contamination up into the container. Such prior art devices are shown in U.S. Pat. Nos. 2,678,630; 2,726,636; and 3,228,377.

Advances in delivery tubes incorporated valves or sealing devices and most current watering devices are formed as a plastic bottle having a screw-on cap incorporating a tube-like water delivery opening. The containers are supported upside down from the side of the cage and, therefore, are vulnerable to damage caused by pets gnawing on the plastic material.

SUMMARY OF THE INVENTION

The present invention involves a guard or enclosure for a plastic watering container for small animals. The enclosure protects the watering container from attack by the small animal, holds the watering container in a vertical inverted position, has means for attaching the water container to the side of the cage and permits rotational movement of the drinking tube to orient the end of the tube in any desired position for the et. The enclosure can be formed from a single sheet of metal material or molded from a hard plastic material. In another embodiment, the enclosure has means for maintaining the drinking tube in a predetermined position.

BRIEF DESCRIPTION OF THE DRAWINGS

The above, as well as other advantages of the present invention, will become readily apparent to those skilled in the art from the following detailed description of the preferred embodiment when considered in the light of the accompanying drawings, in which:

FIG. 5 is an elevational view of a protective enclosure according to an alternate embodiment of the present invention;

FIG. 6 is a bottom plan view of the enclosure shown in FIG. 5 together with the water container shown in FIG. 2; and FIG. 7 is a perspective view of the enclosure and water container shown in FIG. 6.

DESCRIPTION OF THE PREFERRED EMBODIMENT

Figure 1:
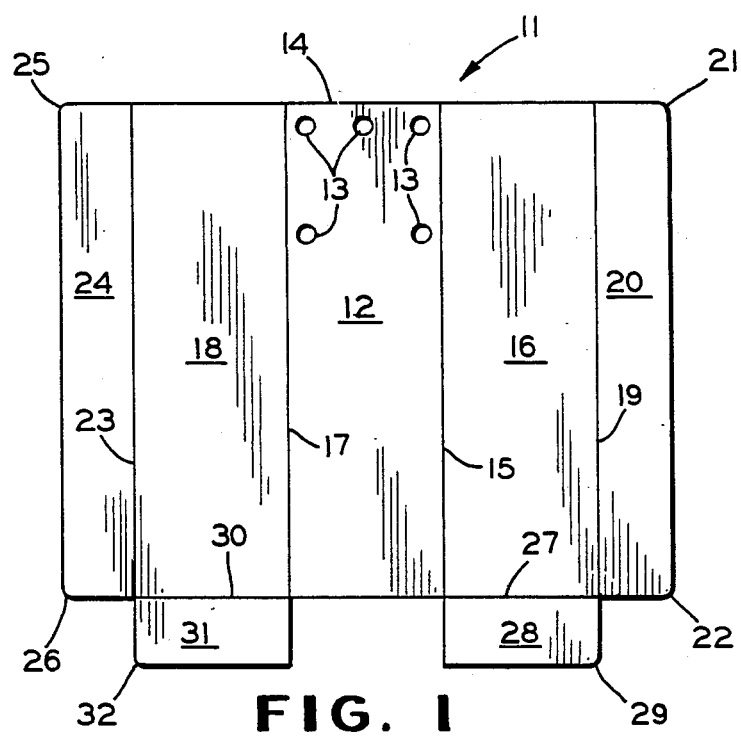
FIG. 1 is an elevational view of a protective enclosure according to the present invention.

There is shown in FIG. 1 a protective enclosure 11 according to the present invention. The enclosure 11 is shown before folding into a configuration to enclose and support a plastic water container. The protective enclosure 11 includes a centrally located rear panel 12 having a plurality of apertures 13 formed adjacent an upper edge 14 thereof. Attached to the rear panel 12 along a right hand edge 15 thereof, is a right hand side panel 16. Similarly, attached along a left hand edge 17 of the rear panel 12 is a left hand side panel 18. The side panels 16 and 18 are approximately the same size as the rear panel 12.

Attached to an opposite edge 19 of the right hand side panel 16 is a right hand front panel 20. The front panel 20 is the same height as the rear panel 12 and the side panels 16 and 18 and is sightly less in width than one half of the width of these panels. Furthermore, an upper outside corner 21 and a lower outside corner 22 of the front panel 20 can be rounded to eliminate any sharp edges. Similarly, attached to an opposite edge 23 of the left hand side panel 18 is a left hand front panel 24 having rounded upper corner 25 and rounded lower corner 26.

Extending from a lower edge 27 of the right hand side panel 16 is a right hand bottom panel 28. The width of the bottom panel 28 is the same as the width of the right hand side panel 16 and the height is less than one half of the width of the rear panel 12. The bottom panel 28 can have a rounded front corner 29. Similarly, attached to a lower edge 30 of the left hand side panel 18 is a left hand bottom panel 31, having a rounded front corner 32.

Figure 2:
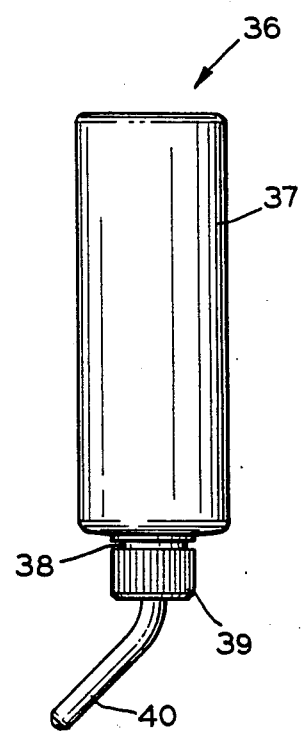
FIG. 2 is an elevational view of a water container for use in the present invention.

In FIG. 2, there is shown a water container 36 including a bottle 37 typically formed of a clear plastic material. An open end of the bottle 37 is formed as a threaded neck 38 for threadably receiving an internally threaded cap 39. Extending from the center of the cap 39 is an angled drinking tube 40 which can include valve means (not shown) for providing drinking water to a small animal.

Figure 3:
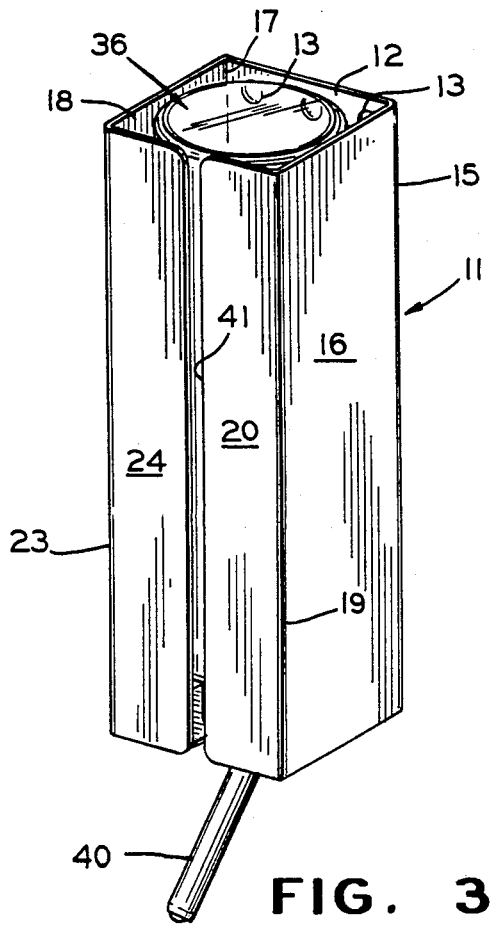
FIG. 3 is a perspective view of the enclosure shown in FIG. 1 and the water container shown in FIG. 2 assembled.
Figure 4:
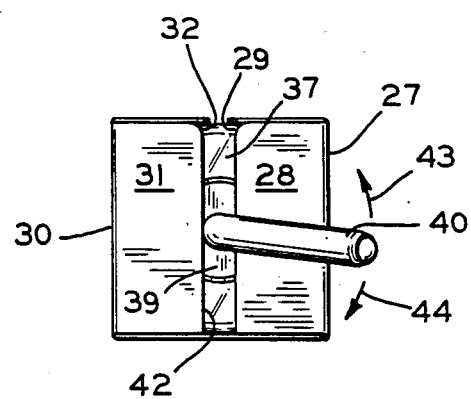
FIG. 4 is a bottom plan view of the enclosure and water container of FIG. 3.

As shown in FIG. 3 and FIG. 4, the protective enclosure 11 is folded along the edges 15, 17, 19, 23, 27 and 30 for enclosing and supporting the water container 36. Since the right hand front panel 20 and the left hand front panel 24 are each less in width than one half of the rear panel 12, a vertically extending slot 41 is formed in the front wall of the protective enclosure 11. Similarly, a slot 42 is formed between the two bottom panels 28 and 31. The slots 41 and 42 permit the walls of the protective enclosure 11 to flex as the water container 36 is either inserted into the open top or removed through the open top. The slot 42 is wide enough to accommodate the diameter of the drinking tube 40 and lightly apply pressure thereto to provide some resistance as the drinking tube 40 is rotated in the direction of arrows 43 and 44 to a desired drinking position.

The apertures 13 formed in the rear panel 12 cooperate with conventional hooks or hangers (not shown) to permit the protective enclosure 11 and water container 36 to be positioned on an inside wall of a small animal cage. The enclosure 11 retains the container 36 in an inverted position. The animal can move the drinking tube 40 to any desired position, but cannot damage the plastic bottle 37 or cap 39 since it is enclosed within the protective enclosure 11. The slot 41 also permits the owner of the pet to determine how much water is left in the water container 36. The enclosure 11 can be formed of a metal material and bent from the planar shape shown in FIG. 1 into the formed shape shown in FIG. 3. Alternatively, the enclosure 11 could be formed of a tough plastic material molded to the shape shown in FIG. 3 which material would resist the destructive efforts of small pets.

There is shown in FIG. 5 a protective enclosure 49 according to an alternate embodiment of the present invention. The enclosure 49 is similar to the enclosure 11 shown in FIG. 1 with the exception that the rounded front corners 29 and 32 on the bottom panels 28 and 31 respectively have been eliminated. A right hand flange 50 having a width equal to the width of the right hand bottom panel 28 extends from a lower edge 51 of the bottom panel 28. The flange 50 has a rounded front corner 52 and a rounded rear corner 53. Similarily, a left hand flange 54 is equal in width to the left hand bottom panel 31 and extends from a bottom edge 55 thereof. The left hand flange 54 has a rounded front corner 56 and a rounded rear corner 57.

As shown in FIG. 6 and FIG. 7, the flanges 50 and 54 are folded along the edges 51 and 55 respectively to extend downwardly in a generally vertical direction on opposite sides of the slot 42. The flanges 50 and 54 prevent rotation of the drinking tube 40 in those instances where it is desirable to prevent the animal from rotating the drinking tube to a position at which the animal would be unable to drink.

One or more hangers 58 of the type shown in FIG. 7 can be utilized to position the protective enclosure 49 and the water container 36 on an inside wall of a small animal cage. The hanger 58 is typically formed of a wire material and includes a straight section 59 which is connected at one end thereof to an angled section 60 by a curved section 61. The angled section 60 is inserted in one of the apertures 13. The straight section 59 is then inserted between an adjacent pair of vertically extending bars in the cage wall. The vertically extending cage bars are typically connected by one or more horizontally extending bars such that the hanger 58 is retained in place and in turn supports the protective enclosure 11 and the water container 36.

In accordance with the provisions of the patent statutes, the principle and mode of operation of the present invention have been described in what has been considered to represent the preferred embodiment. However, it should be understood that the invention may be practiced otherwise than as specifically illustrated and described without departing from the scope of the attached claims.

What is claimed is:

1. A protective enclosure for a water container, the water container including a downwardly extending drinking tube, the enclosure comprising:
   a rear panel having a width and height approximately equal to a diameter and height respectively of the water container;
   a pair of side panels attached to opposite edges of said rear panel each having a width and height approximately equal to the diameter and height respectively of the water container;
   at least one front panel attached to an edge of one of said side panels;
   a pair of bottom panels each attached to a lower edge of one of said side panels, said bottom panels, said rear panels, said side panels and said at least one front panel forming an enclosure open at an upper end for receiving and supporting the water container and having a slot formed between said bottom panels for receiving the drinking tube extending from the water container; and
   a pair of flanges each flange attached to an edge of an associated one of said bottom panels and extending downwardly from said slot formed between said bottom panels.

2. A protective enclosure for a pet water dispensing apparatus comprising:
   a generally planar rear panel including means for mounting on a cage for a pet;
   a pair of generally planar side panels each attached to an opposite edge of said rear panel and extending generally normal to said rear panel;
   a pair of generally planar front panels each attached to an edge of one of said side panels and extending generally parallel to said rear panel;
   a pair of generally planar bottom panels each attached to one of said side panels and defining a slot whereby said rear panel, said side panels, said front panels and said bottom panels form a protective enclosure having an open top for receiving the pet water dispensing apparatus; and
   a pair of flanges each flange attached to an edge of an associated one of said bottom panels and extending downwardly from said slot defined between said bottom panels.

3. The protective enclosure according to claim 2 including at least one rounded corner formed on each of said flanges.

* * * * *